(12) United States Patent
Daily et al.

(10) Patent No.: US 7,376,507 B1
(45) Date of Patent: May 20, 2008

(54) GEOPHYSICS-BASED METHOD OF LOCATING A STATIONARY EARTH OBJECT

(75) Inventors: Michael R. Daily, Albuquerque, NM (US); Steven B. Rohde, Corrales, NM (US); James L. Novak, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 809 days.

(21) Appl. No.: 10/855,145

(22) Filed: May 27, 2004

(51) Int. Cl.
*G01C 21/26* (2006.01)
*H04B 7/185* (2006.01)

(52) U.S. Cl. .................. 701/207; 701/213; 342/357.01; 342/357.06; 340/988

(58) Field of Classification Search ............ 701/207, 701/213–215, 220, 200; 342/357.06, 357.12, 342/357.01; 340/988
See application file for complete search history.

(56) References Cited

U.S. PATENT DOCUMENTS

| 4,809,005 | A | * | 2/1989 | Counselman, III | .......... | 342/352 |
| 4,894,662 | A | * | 1/1990 | Counselman | .......... | 342/357.12 |
| 5,629,626 | A | * | 5/1997 | Russell et al. | .............. | 324/345 |

OTHER PUBLICATIONS

Motivation: How do we Construct a Goodness-to-fit Metric for a Model?—Retrieved via the Internet: http://www.itl.nist.gov/div898/handbook/pri/section5/pri5992.htm.*
Sinko, J., "A compact earth tides algorithm for WADGPS," *Proc. ION GPS* 8(6), 35 (1995), no month.
Longman, I.M., "Formulas for computing the tidal accelerations due to the moon and the sun," *J. Geophysic. Res.* 64(2), 2351 (1959), no month.
Wu, B., et al., "Determination of solid earth tide phase lag by satellite observation data," *Chinese Science Bulletin* 44(5), 459 (1999), no month.
Petrov, L., "Study of harmonic site position variations by very long baseline interferometry" *J. Geophys. Res.* 108(B4), 5 (2003), no month.
Chapin, D., Gravity Instruments: Past, present, and future, *The Leading Edge* 17, 100 (1998), no month/date.
Goodkind, J. M., "The superconducting gravimeter," *Rev. Sci. Inst.* 70(11), 4131 (1999), no month/date.
Richter, B. et al., "A New Generation of Superconducting Gravimeters," *Proc. 13th Int. Sym. Earth Tides*, Brussels (1998), no month.
Bernstein, J., "An Overview of MEMS Inertial Sensors," *Sensors*, pp. 14-21, Fev. 2003, no date.
Gannon, J. et al., "A Robust Low Noise MEMS Servo Accelerometer," *ISA* (2001), no month/no date.
"LaCoste & Romberg: The first name in gravity since 1939," [retrieved on Mar. 25, 2004]. Retrieved from the Internet: URL:http://www.lacosteromberg.com.
"Honeywell QA3000 Q-Flex® Accelerometer," [retrieved on May 10, 2004]. Retrieved from the Internet: URL:http://www.inertialsensor.com.
"Scintrex CG-5 AutoGrav," [retrieved on Mar. 25, 2004]. Retrieved from the Internet: URL:http://www.scintrexitd.com.
"Applied MEMS Si-Flex Accelerometer," [retrieved on May 10, 2004]. Retrieved from the Internet: URL:http://www.appliedmems.com.
"GWR Instruments, Inc.: Superconducting Gravimeters," [retrieved on Mar. 26, 2004]. Retrieved from the Internet: URL:http://www.qwrinstruments.com/GWR_tidalbro.html.

* cited by examiner

*Primary Examiner*—Yonel Beaulieu
(74) *Attorney, Agent, or Firm*—Kevin W. Bieg

(57) ABSTRACT

A geophysics-based method for determining the position of a stationary earth object uses the periodic changes in the gravity vector of the earth caused by the sun- and moon-orbits. Because the local gravity field is highly irregular over a global scale, a model of local tidal accelerations can be compared to actual accelerometer measurements to determine the latitude and longitude of the stationary object.

24 Claims, 9 Drawing Sheets

US 7,376,507 B1

GEOPHYSICS-BASED METHOD OF LOCATING A STATIONARY EARTH OBJECT

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to geolocation and, in particular, to a geophysics-based method of determining the latitude and longitude of a stationary earth object using the gravity vectors of the earth, sun, and moon.

BACKGROUND OF THE INVENTION

Historical forms of navigation include pilotage, dead reckoning, celestial navigation, radio navigation, and inertial navigation. Radio navigation relies on radio-frequency sources with known locations, such as Global Positioning System (GPS) satellites or terrestrial airport beacons, to determine where one is relative to where one wants to go. Inertial navigation systems rely on knowing one's initial position, velocity, and attitude and measuring attitude rates and accelerations to provide an estimate of one's position after movement away from the initial position. Integrated systems further improve performance by combining the high-bandwidth motion control of inertial navigation with the long-term position location accuracy of GPS. See M. S. Grewal et al., *Global Positioning Systems, Inertial Navigation, and Integration*, John Wiley & Sons, New York (2001).

GPS is a satellite-based navigation system that provides continuous positioning and timing information anywhere in the world under all weather conditions. GPS nominally uses at least 24 operational satellites with known relative locations, each satellite in one of six nongeostationary, circular orbits about 2200 km high above the earth. These orbiting satellites continuously broadcast high frequency radio signals to passive receivers on earth. Pseudoranges, or estimated distances from the receiver to the satellites, are computed from the relative time delay of the received signals from several of the satellites. Normally, information is required from four satellites to synchronize the receiver's internal clock with the highly accurate GPS satellite clocks and enable a precise position fix to be determined from the pseudoranges by trilateration. Positioning accuracy for civilian applications is nominally tens of meters. Differential techniques can significantly improve the accuracy of GPS-derived positions by using tandem receivers to simultaneously track the same GPS satellites, thereby enabling submeter-positioning accuracy. GPS has many attractive features, such as inexpensive and light-weight receivers, high positional accuracy in three dimensions, global coverage, all-weather capability, and availability to an unlimited and diverse set of users. However, GPS obviously requires access to the satellite radio signals and such signals may not be available in some locations or may be vulnerable to electronic jamming.

Alternatively, inertial navigation can be used for active position measurement. Inertial navigation systems typically use an inertial measurement unit (IMU) comprising a cluster of sensors to provide full three-axis attitude measurements. For example, the cluster can comprise three accelerometers for measuring acceleration in three directions and three gyroscopes for measuring rotation rate and to provide a reference frame for the accelerometers. The acceleration can be doubly integrated and the rotation rate can be singly integrated by a navigation computer to provide position. The IMU can be a gimbaled system, wherein the sensor cluster is mounted in a gimbal frame to isolate the sensors from external rotations of the host vehicle and keep them level and pointing in a fixed direction via torquing devices. Alternatively, the IMU can be a strapdown system, wherein the sensor cluster is strapped down to the frame of the host vehicle and the measurements are made in reference to the vehicle axes, for example, the roll, pitch, and yaw axes of an airplane in flight.

Inertial navigation systems have some advantages over other forms of navigation, such as GPS. Since IMUs are autonomous, they do not rely on external navigation aids, such as landmarks, celestial objects, or satellites, and they can be used underwater or in underground tunnels. Furthermore, since IMUs are completely on-board the host vehicle, the accelerations and rotation rates can be easily integrated with guidance and control systems and they are inherently stealthy and immune to jamming. However, acquisition, operating, and maintenance costs, system size and weight, and power requirements tend to be higher with IMU systems than with GPS systems. Most importantly, measurement drift, due to the integration of IMU acceleration and rotation rate errors, can cause navigation errors to grow dramatically with time.

There are currently many methods to tracking objects that move relatively fast, such as fixed wing aircraft. However, tracking the movement of objects that move intermittently remains a problem in situations where GPS is passively or actively denied and access to reference beacons is not otherwise available. In particular, IMUs are most useful in situations in which the time duration of the object's motion is sufficiently short such that the accumulated drift error is negligible. IMUs may also be useful in integrated navigation systems in which access to sky or terrestrial reference beacons is available periodically to provide aiding for the IMU, allowing for reinitialization of the IMU position to compensate for the measurement drift. However, without access to these references, even perfect initial location information coupled with a perfect IMU would quickly become useless for locating slow-moving or objects at rest. In particular, there are no systems of any kind that can continuously and reliably monitor the latitude and longitude of an intermittently stationary object without access to external reference beacons or satellites.

The geophysics-based method of present invention overcomes the limitations of conventional navigation systems by analyzing the fundamental properties of earth gravity and spin to obtain a fix on the position of a stationary earth object. The measurement of geophysical phenomenon enables the determination of latitude and longitude without the need for external infrastructure (e.g., satellites needed for GPS) or foreknowledge of how the object moves around or the general area it is in (e.g., as required for inertial navigation systems). Because gravity cannot be shielded and acts at long distances, the geophysics-based method can determine object position in underground and shielded locations. It does not require visual or infrared access to the sky, as in celestial navigation or GPS. It also is immune to RF jamming or magnetic jamming. Nor does the present invention exhibit the time-dependent drift error problems of IMUs.

SUMMARY OF THE INVENTION

The present invention is directed to geophysics-based method for fixing a position of a stationary earth object, comprising providing a model that predicts tidal acceleration at a plurality of locations on the earth as a function of time and location relative to a reference time in an earth-fixed frame comprising orthogonal axes; measuring an acceleration in at least one direction of the stationary earth object at an actual location for a period of time relative to the reference time with a sensor package in a sensor frame comprising orthogonal axes; transforming the sensor frame to a transformed frame using an estimated rotation matrix; estimating a position for the object to input to the model to provide a predicted acceleration at the estimated location; comparing the measured acceleration in the transformed frame to the predicted acceleration in the earth-fixed frame with a pattern recognition algorithm to provide a goodness-of-fit metric for the estimated position; and iterating the steps to provide the position fix for the actual location of the stationary earth object. The earth-fixed frame preferably comprises a North-East-Down coordinate system. The estimated position can comprise an estimated latitude and longitude of the object. The method can provide a useful position fix within hours and, preferably, in greater than 12 hours (i.e., one tidal period). The sensor package preferably comprises at least one accelerometer having a sensitivity of better than 1 µG, and more preferably less than 10 nG, for frequencies of approximately 23 µHz.

In FIG. 1 is shown a diagram of how the geophysics-based method of the present invention compliments existing IMU systems when GPS is denied. If GPS is available, it is useful for all but the very shortest of measurement times or geolocation durations. IMUs may also be useful over most time scales when periodic access to GPS is available for reinitialization of the IMU position. However, if GPS is not available, IMU performance degrades rapidly with slow moving objects, due to accumulated measurement drift. Simulations with perfect sensors suggest that the resulting navigation errors may accumulate at rates of as high as kilometers per hour.

On the contrary, performance of the geophysics-based position location method of the present invention improves with measurement time. As a result, the method is particularly useful for tracking intermittently-moving objects in GPS-denied environments. Examples of such objects are ground vehicles and shipping containers. Other objects that move only occasionally also fall into this category, such as office equipment, computer systems, missile launchers, and other high-value assets. It is anticipated that in many situations involving stationary high-value assets, access to sky or terrestrial beacons will be denied for long periods of time, such as may be the case in subterranean storage locations. In fact, just about everything that moves also spends most of its time sitting still for at least hours at a time. By determining the location of an object during the times it is stationary and keeping track of when movement started and stopped, the method of the present invention can track intermittently moving objects anywhere on or near the surface of the earth's land masses. The method requires no external infrastructure and no foreknowledge of how the object might be moved, such as would be required using GPS or an aided IMU approach.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 5A shows the calculated asymmetric shift in the semi-diurnal tidal acceleration inequality for different latitudes. FIG. 5B shows the calculated phase shift of the tidal acceleration with longitude at the latitude of Washington, D.C.

DETAILED DESCRIPTION OF THE INVENTION

Figure 1:
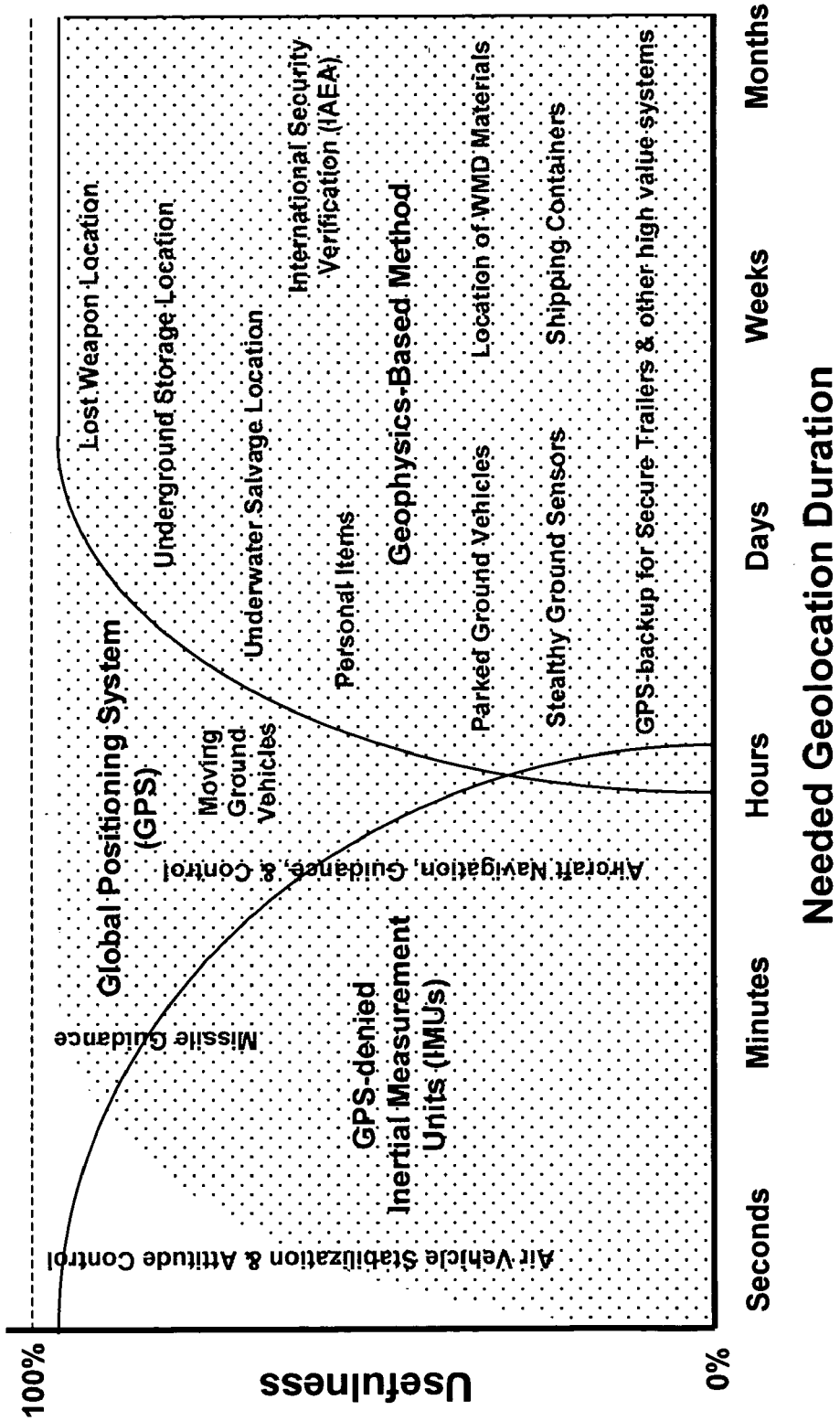
FIG. 1 shows the usefulness of GPS, GPS-denied IMUs, and the geophysics-based method for fixing the position an object on the earth's surface as a function of duration at a geolocation.

The present invention comprises a geophysics-based method for determining the position of a stationary earth object using the periodic changes in the gravity vector of the earth caused by the sun- and moon-orbits. Because the local gravity field is highly irregular over a global scale, a model of local tidal accelerations can be compared to actual accelerometer measurements to determine the latitude and longitude of the stationary earth object.

Tidal Acceleration Model

The earth, sun, and the moon are coupled together by gravitational attraction. For example, the mutual gravitational attraction of the earth and the moon results in the rotation of the earth and the moon about the center of mass of the pair. The common center of mass is located about 1700 km below the earth's surface. This attraction produces an acceleration that acts in the direction of the vector connecting the center of mass of the earth and the moon. Likewise, the mutual gravitational attraction of the earth and the sun produces an acceleration that acts in the direction of the vector connecting the center of mass of the earth and the sun. The lunar and solar acceleration vectors vary in both direction and magnitude during the orbits of the moon and the sun, respectively. Because the acceleration vectors add, the vector due to the lunar attraction and that due to the solar attraction combine to produce a complex, time-varying tidal acceleration vector. This tidal acceleration vector can be thought of as an AC component of gravity that is periodic with both the lunar and solar orbits. In particular, the influence of the moon and the sun on local gravity can be measured as they pass overhead. This local gravity variation can then be correlated with the time of day and day of the year to determine latitude and longitude of an object's position on the earth.

The effect of the tidal acceleration vector is observable as ocean tides and in the deformation of the earth's shape, known as solid earth tides. See, e.g., P. Melchior, *The Tides of the Planet Earth*, Pergamon Press (1983) and W. Lowrie, *Fundamentals of Geophysics*, Cambridge Univ. Press (2001). As noted above, these tides have daily variations in periodicity, due to the diurnal rotation of the earth about its spin axis, and monthly variations in range, due to the revolution of the moon about the earth and the effects of the gravitational attraction of the sun on the tidal bulges produced by the moon. Combining the earth's rotation (i.e., a lunar day of 24.8 hours) with the moon's revolution about the earth (i.e., a sidereal month of 27.3 days) produces a major tidal component that is semi-diurnal with a bimonthly periodicity in the range of tides. Additional month-to-month variations in the range of the tides are caused by the effects of the gravitational attraction of the sun, which either increases or decreases the daily tidal bulges produced by the moon. At conjunction, the new moon is on the same side of the earth as the sun, and the ellipsoidal deformation and the tidal acceleration are at a maximum. The ellipsoidal deformation and the tidal acceleration will again be a maximum one-half month later, when the sun and moon are at opposed sides of the earth (i.e., at full moon). The bimonthly high tides at conjunction and opposition are called spring tides. The largest amplitude of the semi-diurnal ocean tide can be several meters at conjunction. Likewise, the largest amplitude of the solid earth tide is 10 to 50 cm. Alternatively, the lunar and solar tides tend to cancel at intermediate times, producing very low tides, or neap tides, at quadrature when the sun and the moon are oriented at 90° (i.e., at a waxing or waning moon).

The gravitational attraction of the moon on the earth is directed toward and varies with distance from the moon. This strong gravitational attraction of the moon on the earth produces a tidal bulge on the near side of the earth, toward the moon. The rotation of the earth around the common center of mass also induces a centrifugal acceleration directed away from the moon. The stronger centrifugal acceleration produces a tidal bulge on the far side of the earth, away from the moon. The resulting force (i.e., centrifugal acceleration plus gravitational attraction) produces a prolate ellipsoidal deformation of the earth along the earth-moon centerline and is responsible for the lunar tides.

Figure 2A:
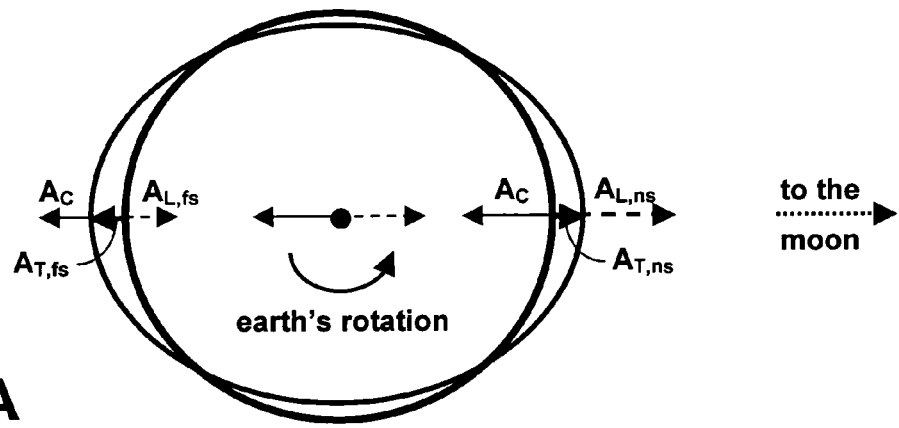
FIG. 2A shows the tidal accelerations on the near- and far-side of the earth due to gravitational attraction of the moon, as viewed from above the moon's orbit.

In FIG. 2A is shown the tidal accelerations on the near- and far-side of the earth due to gravitational attraction of the moon, as viewed from above the moon's orbit. Ignoring the tilt of the earth's rotational axis relative to the moon's orbit, the near-side lunar tidal acceleration $A_{T,ns}$ toward the moon can be obtained by subtracting the constant centrifugal acceleration, $A_C$, of the earth from the strong lunar gravitation on the near side of the earth, $A_{L,ns}$, according to:

$$A_{T,ns} = Gm\left(\frac{1}{(r-R)^2} - \frac{1}{r^2}\right)$$

where G is the gravitational constant $(6.67 \times 10^{-11} (\text{N-m}^2)/\text{kg}^2)$, m is the mass of the moon $(0.07349 \times 10^{24}$ kg), r is the separation of the centers of the earth and the moon $(3.84467 \times 10^8$ m), and R is the mean radius of the earth (6371 km). This tidal acceleration raises the tide on the near side of the earth.

Likewise, the far-side lunar tidal acceleration, $A_{T,fs}$, on the side of the earth away from the moon can be obtained by subtracting the variable lunar gravitation from the centrifugal acceleration on the far side of the earth according to $$A_{T,fs} = Gm\left(\frac{1}{r^2} - \frac{1}{(r+R)^2}\right)$$

This tidal acceleration raises the tide on the far side of the earth. Therefore, a stationary observer on the earth will experience two full tidal cycles, or semi-diurnal tides, in one day.

The centrifugal force felt at each point on the earth is uniform and outward pointing. However, the lunar gravitational force decreases as a function of distance from the moon and is always pointing toward the moon. Therefore, the difference in distance to the moon from the near-side of the earth to the far-side of the earth will produce a residual gravitation effect of up to 0.22 µG from one side of the earth to the other.

Figure 2B:
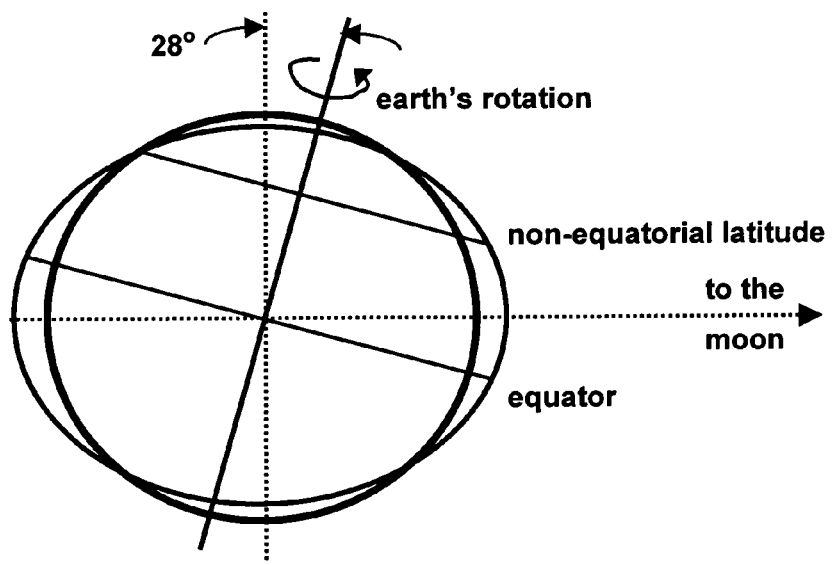
FIG. 2B shows that how the diurnal inequality varies as a function of non-equatorial latitude, due to the declination angle between the earth's rotational axis and the perpendicular to the plane of the moon's orbit about the earth, as viewed normal to the moon's orbit.

In reality, as shown in FIG. 2B, the rotational axis of the earth is tilted at a declination angle of 28° relative to the perpendicular to the plane of the moon's orbit about the earth. This lunar declination, when combined with the residual gravitational effect, causes the relative heights of the semi-diurnal tides to vary as a function of non-equatorial latitude. The difference in height between successive high tides or successive low tides is known as the diurnal inequality. At the equator, the semi-diurnal-tides are equal. However, the diurnal inequality increases at the higher (or lower) latitudes, until only one diurnal tide is observed at the highest latitudes. The corresponding change in diurnal tidal acceleration inequality as a function of latitude can therefore be used to determine the latitude of an object.

When observed in the earth's reference frame, longitude can be determined by measuring the time-varying semi-diurnal changes in gravity caused by the revolution of the moon around the earth. Local changes in gravity will be periodic with a phase proportional to the difference in longitude between a stationary object for which the position fix is desired and some arbitrary, but known, reference location. It is assumed that the stationary object contains an electronic calendar and clock, and can determine the phase relative to the reference time and location.

Figure 3:
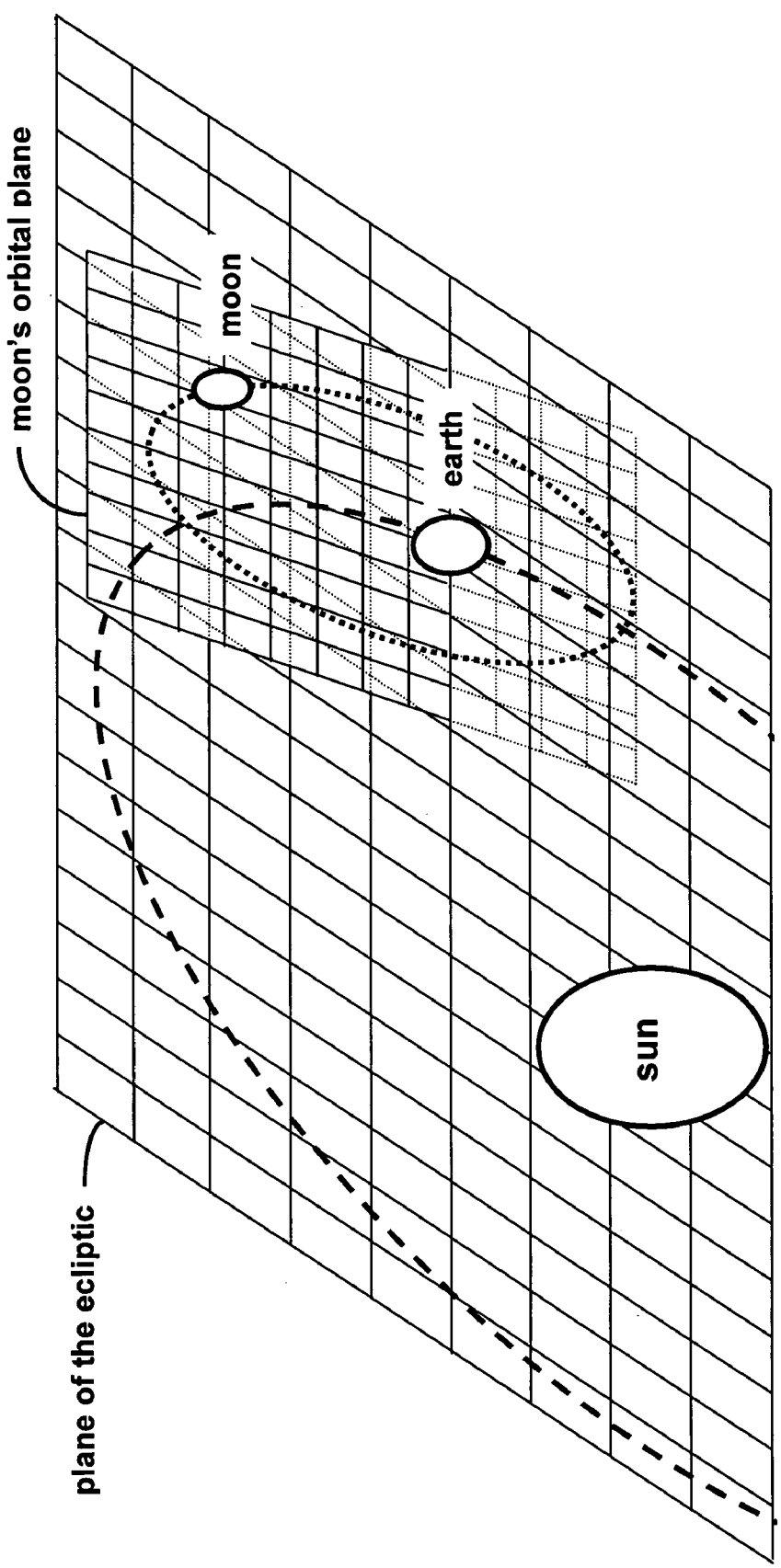
FIG. 3 shows a schematic illustration of the orbits of the earth around the sun and the moon about the earth.

In FIG. 3 is shown a schematic illustration of the orbits of the earth around the sun and the moon about the earth. Like the moon, the sun also produces a prolate ellipsoidal deformation of the earth, but in the ecliptic plane (the plane of the earth's orbit around the sun). The plane defined by the orbit of the moon about the earth is inclined at a slight angle of about 5.2° to the ecliptic plane. Although the sun is much more massive than the moon, the solar tides will be smaller than the lunar tides, because the distance from the earth to the sun is much greater. Therefore, the maximum tidal effect of the sun is only about 45% that of the moon. The tidal acceleration due to the sun can be obtained in a similar manner to the lunar tidal acceleration. The sun will generate a change of about 0.1 µG in local gravity from the side of the earth nearer to the sun to the side of the earth far from the sun, with seasonal periodicity.

Because the orbits of the moon and the sun are not synchronous, and the lunar orbit is inclined to the plane of the ecliptic, the combined tidal acceleration vector is a unique function of earth latitude and longitude, and time. Likewise, the superposition of the lunar and solar tidal accelerations produces time-varying changes the sensed gravity measurement. The combined effects of the sun and the moon can cause a tidal acceleration of up to about 0.3 µG that can be measured by an appropriate sensor package.

Additional variations in the tides and the tidal accelerations result from the eccentricity of the moon's orbit, the tilt of the earth in relation to the sun, the gravitational pull of the planets, etc. Furthermore, dynamic forces in and above the earth, such as wobble from the internal modes of the earth, plate tectonic motions, storm surges, and atmospheric pressure changes due to passing weather systems can cause local variations in gravitational forces. Finally, a by-product to the ocean tides is ocean tide loading that results in elastic deformation of the earth's crust near the coasts, due to variations in the ocean water column. This ocean loading can cause additional deformation of the earth near a coastal area of 15 to 20 cm. This ocean tidal motion is particularly influential at high latitudes, where the earth tides are weak.

Figure 4:
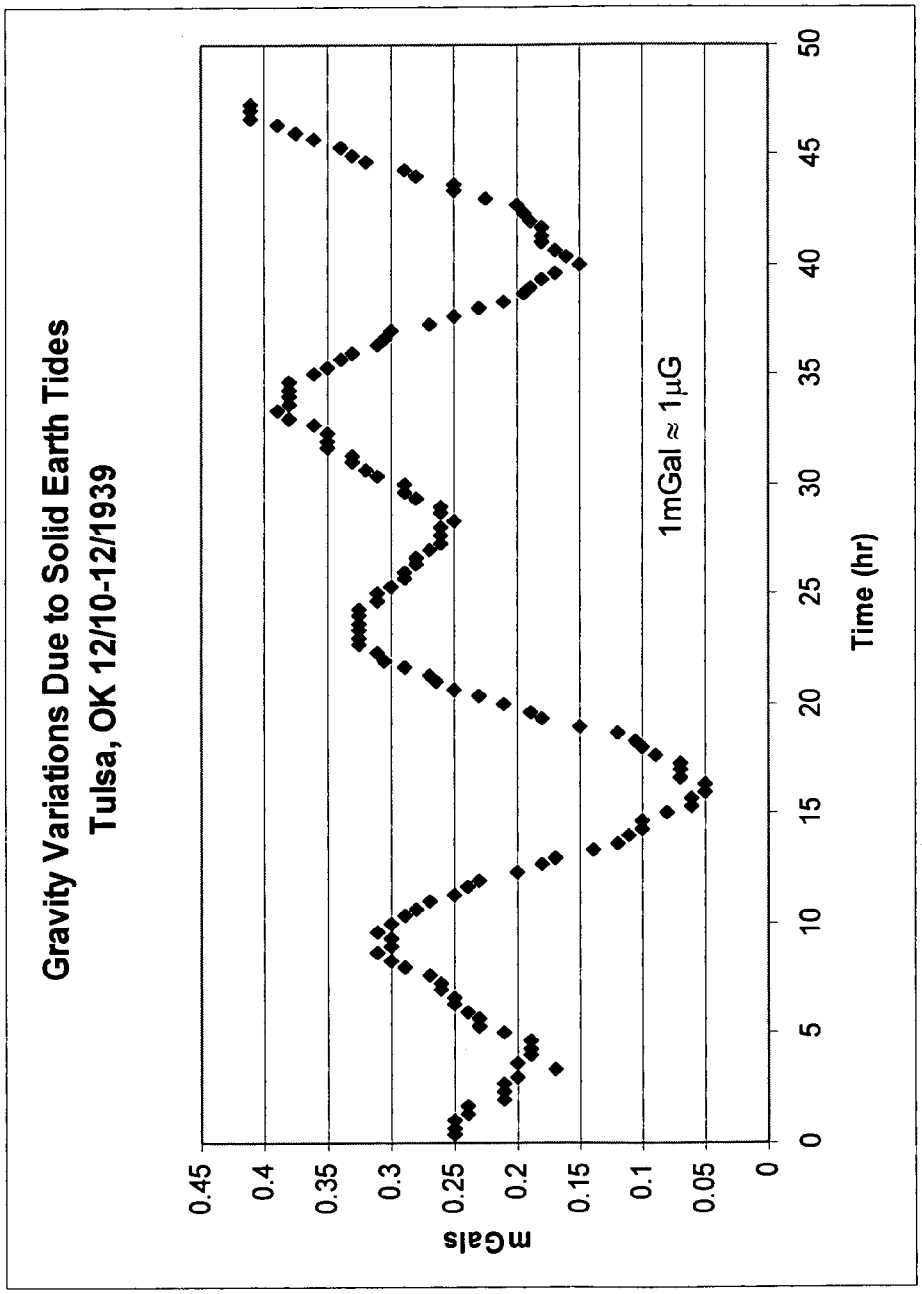
FIG. 4 shows a portable gravimeter measurement of the semi-diurnal gravity variations in Tulsa, Okla. on Dec. 10-12, 1939, due to lunar and solar tidal accelerations.

In FIG. 4 is shown a portable gravimeter measurement of the semi-diurnal gravity variations in Tulsa, Okla. on Dec. 10-12, 1939. Even this 60-year-old gravimeter could easy detect and measure the local tidal accelerations. The revolution of the moon about the earth causes a gravitational periodicity of about 13.5 days that is superposed the semi-diurnal tidal acceleration due to the rotation of the earth with a period of 12 hours and 25 minutes. The diurnal tidal acceleration inequality is quite large, about 0.15 mGals (i.e., 0.15 µG), because Oklahoma City is at a relatively high latitude.

The oscillatory effects of the earth tidal variations have generally been considered a source of error for geoscience and GPS navigation. For example, gravity variations due to earth tides are frequently larger than gravity variations of interest for geophysical and geodesic measurements. It is generally desirable to remove the oscillatory signals from the measurements to detect nontidal signals due to, for example, subsurface structures or oil and gas deposits. Therefore, sophisticated models have been developed to predict earth tides, to correct the measurements for the earth tidal displacements. Typically, harmonic analysis has been used to remove the effects of the earth tides on the raw data and discern the local gravity variations. In particular, solid earth tidal displacements have been extensively studied for correction of Wide Area Differential GPS (WADGPS). For example, given a latitude and longitude, WADGPS models predict the displacement of the solid earth in the NED frame as a function of time, taking into account local geology. See J. Sinko, "A compact earth tides algorithm for WADGPS," *Proc. ION GPS* 8(6), 35 (1995). See also I. M. Longman, "Formulas for computing the tidal accelerations due to the moon and the sun," *J. Geophys. Res.* 64(2), 2351 (1959); J. M. Goodkind, "Test of theoretical solid earth and ocean gravity tides," *Geophys. J. Int.* 125, 106 (1996); B. Wu et al., "Determination of solid earth tide phase lag by satellite observation data," *Chinese Science Bulletin* 44(5), 459 (1999); and L. Petrov, "Study of harmonic site position variations by very long baseline interferometry," *J. Geophys. Res.* 108(B4), 5 (2003).

The method of the present invention has built on these earlier models to derive a model for determining tidal accelerations as a function of latitude, longitude, and time. However, unlike the previous work, the tidal acceleration model of the present invention does not need to make assumptions about local geology. Furthermore, solid earth tidal displacement and acceleration models have not been previously used for geolocation.

A tidal acceleration model was developed, based on the fundamental properties of earth gravity, that outputs a predicted tidal acceleration vector as a function of date, time, latitude and longitude. The tidal acceleration model used a geodetic frame, the World Geodetic System (WGS84). This frame is best suited to describing the motion of satellites and orbiting bodies. Other coordinate systems using locally level coordinates are useful on small scales, but define the earth locally, relative to the earth's geoid, and therefore represent the earth as being locally flat. In the current discussion, references to the North-East-Down frame use the WGS datum, wherein the D axis points to the interior of the earth perpendicular to the reference ellipsoid at the local point of interest, the N axis points toward true north, and the E axis points east in a direction orthogonal to the N and D axes. In the NED frame, the predicted acceleration vector comprises time-varying orthogonal components, $N(t)$, $E(t)$, $D(t)$, corresponding to the north, east, and down directions in the NED frame. Predictions in the NED frame can be directly related to the latitude and longitude of an object's position.

Simulations were performed using the tidal acceleration model that included diurnal, monthly, and seasonal gravitational effects. The model used for the simulations had an accuracy of about 10.3 nG away from coastal areas. The frequency of the semi-diurnal motion of interest for tidal accelerations is about 23 µHz. The model did not include "out-of-band" accelerations (i.e., in the high frequency regime) or "in-band" accelerations (i.e., in the low frequency regime) that can interfere with the relatively weak, low frequency accelerations due to earth tides. However, the out-of-band accelerations, due to office noise, people or vehicles moving nearby, earthquakes, high frequency vibrations, etc., can be easily filtered to pass the lower frequency signals of interest. Sources of "in-band" noise, such as 1/f noise, ocean tides, and atmospheric pressure changes, cannot be easily filtered out. However, to the extent that the behavior of in-band sources can be predicted, their effect on the tidal acceleration model can be eliminated.

Figure 5B:
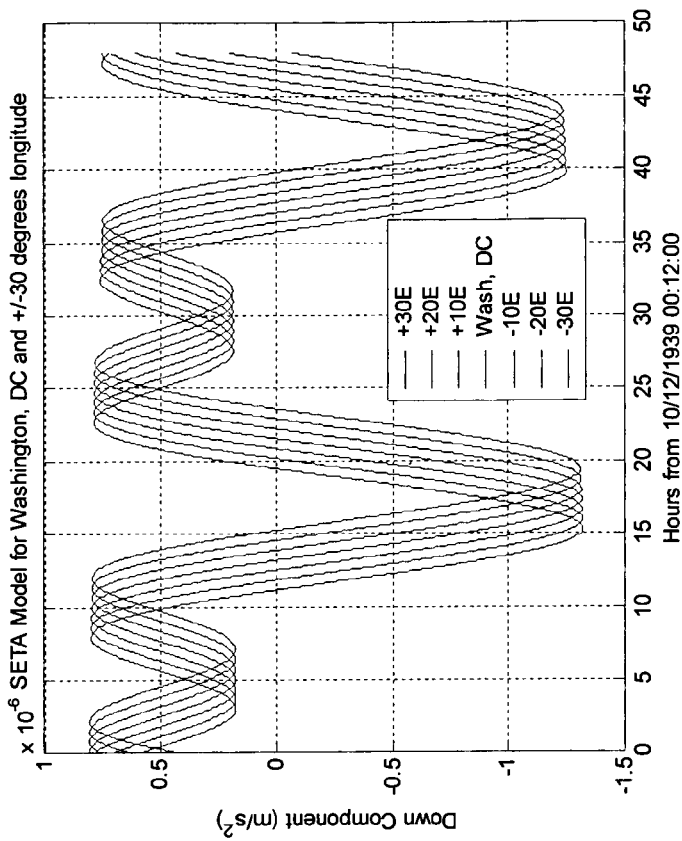
FIGS. 5A and 5B show the predicted down component of the tidal acceleration as a function of time at Washington, D.C. and at various latitudes and longitudes away from Washington, D.C., calculated using a tidal acceleration model.
Figure 5A:
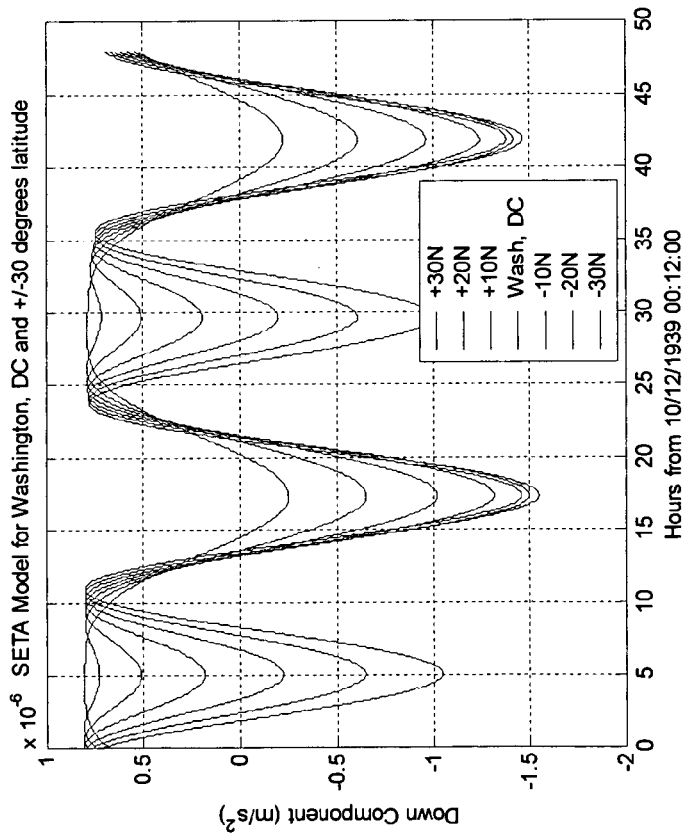

In FIGS. 5A and 5B are show the predicted down component of the tidal acceleration as a function of time at Washington, D.C. and at various latitudes and longitudes away from Washington, D.C. on Oct. 12, 1939, calculated using the model. FIG. 5A shows the calculated temporal gravity variation for different latitudes. Note that the asymmetric shift in the relative amplitudes of the semi-diurnal tidal accelerations (i.e., the diurnal tidal acceleration inequality) corresponds to the periods of the lunar and solar tidal acceleration components coming into constructive and destructive interference. At Washington, D.C. (i.e., at 38.9N latitude) the diurnal tidal acceleration inequality is about 150 nG for this date. The diurnal tidal acceleration inequality increases at the higher latitudes, until only one diurnal tidal acceleration (i.e., one diurnal tide) is observed at a latitude of +30N of Washington, D.C. Conversely, the calculated diurnal tidal acceleration inequality decreases towards equatorial latitudes and is only about 50 nG at −30N of Washington, D.C. The effect of the earth's rotation can be seen in FIG. 5B, which shows the phase shift with longitude at the latitude of Washington, D.C. (i.e., at −77.016E). The phase shift is about 15° longitude per hour, which corresponds to the 360°/24 hour interval. This example was chosen to be illustrative, and the general situation is more complicated and requires signal processing, as described later. Nevertheless, the combined effects of the sun and the moon produce a unique tidal acceleration that varies with location (i.e., latitude and longitude), date, and time of day.

As described above, the temporal-spatial variations in the tidal acceleration vector can provide both latitude and longitude information. By using only the AC component of the tidal accelerations, local gravity variations can be ignored. Alternatively, latitude can be determined by comparing the earth's center-of-gravity vector and the vector direction of the earth's spin axis at the object's location. This may be useful in providing a redundant measurement of latitude. The angular difference between the spin axis and the center-of-gravity vectors uniquely determines latitude. The spin axis vector can be determined using gyrocompassing techniques, such as are routinely used in aircraft navigation for determining true north. Such center-of-gravity vector measurements, both near- and far-field, are routinely performed in scientific geophysical studies to understand subsurface structures, such as those containing oil. Variations in the gravity vector are represented by the geoid, which is an imaginary surface normal to the composite gravity vector. Unfortunately, the geoid is not a sphere, but rather a complex surface due to the local variations in gravity arising from surface features (e.g., mountains, lakes, etc.) and subsurface inhomogenieties (e.g., oil and gas deposits, subsurface structures, etc.). Since the geoid has not been mapped at all earth locations, particularly in remote areas, accurate determination of true center of the earth from gravimeter measurements or plumb line methods can be difficult. These inaccuracies in the gravity vector can produce uncertainties in the latitude determination using this alternate method.

Sensor Package

Because the fundamental effect of gravity due to the sun and moon produces time and direction variations in acceleration, any sensor capable of measuring acceleration or an effect produced by acceleration can be used with the method of the present invention. Direct measurement of the local tidal acceleration is preferred. A velocity sensor, that measures the first integral of acceleration, or a displacement sensor, that measures the second integral of acceleration, can also be used to measure the velocity or displacement of the local earth surface and differentiated to obtain the tidal acceleration vector. However, both velocity and displacement measurements require knowledge of the local mechanical properties of the earth.

An accelerometer-based sensor package should be capable of measuring narrowband gravitational signals with magnitudes and frequencies characteristic of the lunar and solar orbits. Therefore, the sensor package should preferably have sub-μG sensitivity in the range of 0.03 to 23 μHz (i.e., from seasonal to semi-diurnal cycles). More preferably, the sensitivity of the sensor package should be less than 10 nG to enable the method to converge faster to a position fix. The sensor package preferably can measure acceleration as a function of time in three orthogonal directions X(t), Y(t), and Z(t) in the reference frame of the sensor coordinate system. Therefore, the absolute acceleration can be measured in terms of three mutually perpendicular components of the total acceleration vector. The vector sensor package preferably comprises a cluster of three accelerometers with nominally orthogonal axes. The sensor package should preferably be "self-orienting" and be capable of working in any orientation. A triaxial sensor package capable of functioning in any orientation with respect to the local gravity vector would need to have orthogonal accelerometers with a dynamic range of +/−1 G. Such a triaxial sensor can be strap-downed to and rigidly mounted to a stable platform that is stationary relative to the fixed earth frame during the measurement period. The sensor package can also comprise a gimbaled platform wherein the sensor package self-levels within a fixed outer structure. With such a gimbaled system, one axis can be oriented "down" (perpendicular to the geoid), and experience the full 1 G offset due to normal gravity. The orthogonal horizontal accelerometers can operate over a much smaller dynamic range, enabling higher signal gains, thereby enhancing the horizontal resolution.

The sensor package should be vibration resistant, especially in the low frequency range. The package is preferably capable of force-feedback control and sigma-delta noise filtering to provide good linearity and high measurement accuracy. The sensor package should be deployed with an internal clock that is synchronized to coordinated universal time (UTC) or some other time reference. The sensor package can be powered by a primary source and/or a secondary battery. Preferably, the sensor system can be a completely solid state package that is compact and portable and can be hermetically sealed for stability. The sensor should exhibit temperature stability and low drift to enable measurements of low tidal frequency.

Accelerometers are routinely used for measuring the application of forces and for motion measurement, and vibration and shock sensing. They are used in large quantities in automobiles to activate safety systems, to improve vehicle stability, and for electronic suspension. Accelerometers designed for low-frequency operation are used in gravimeters, which measure gravity fields. Gravimeters are specifically designed to measure long period signals, including solid earth tides. Seismometers are used for seismic prospecting and for sensing earthquakes and underground explosions. Seismic waves span a wide range of amplitudes and frequencies, but tend to have accelerations exceeding the pull of gravity, with time scales from milliseconds up to about an hour. However, new designs and the use of electronic force-feedback technology is leading to improvements in sensitivity, bandwidth, dynamic range, linearity, and drift, thereby closing the gap between gravimeters, seismometers, and others types of accelerometers.

Gravimeters are specifically designed to operate at low frequencies (e.g., less than 0.1 Hz) and low noise levels in a precisely leveled instrument. Gravimeters have historically come in three main types: pendulums, falling bodies, and mass-spring sensors. See D. Chapin, "Gravity instruments: Past, present, future," *The Leading Edge* 17, 100 (1998). Both pendulum and free-fall gravimeters can provide an absolute measurement of gravity. Pendulum gravimeters rely on the accurate measurement of the period of the pendulum that is directly proportional to gravity. However, pendulum gravimeters have accuracies of only about 100 μGal. Free-fall gravimeters rely on accurately measuring the distance an object falls as a function of time by laser interferometry. Although these gravimeters have accuracy of about 1 μGal, they are complex and not very portable. See T. M. Niebauer et al., "A new generation of absolute gravimeters," *Metrologia* 32, 159 (1995).

The most portable and most rugged field gravimeter is based on measuring the stretch of a spring under the load of a proof mass. LaCoste and Romberg manufacture an inclined zero-length mass-spring gravimeter that has an accuracy of a few μGal. See "LaCoste & Romberg: The first name in gravity since 1939," [retrieved on 2004-3-25]. Retrieved from the Internet:<URL:http://www.lacosteromberg.com>. Because of its ease of use and portability, the spring-type gravimeter is widely used for airborne, shipboard, ground-based, and borehole surveys. However, they are susceptible to calibration and environmental drift, which limits their accuracy over long time periods. A more rugged relative gravimeter has been developed by Scintrex using quartz as the zero-length spring material rather than metal. See "Scintrex CG-5 AutoGrav," [retrieved on 2004-3-25]. Retrieved from the Internet:<URL:http://www.scintrexltd.com>. Quartz has better elastic properties than metal and is not subject to fatigue or memory. Using force-rebalanced quartz (FBQ) technology, the Scintrex gravimeter can measure a 300 nG (peak to peak) AC signal atop a 1 G offset (i.e., −130 dB dynamic range). Recently, a superconducting gravimeter has been developed in which the mechanical spring is replaced by magnetic levitation of a superconducting sphere in the field of superconducting, persistent current coils (i.e., a "virtual spring"). Direct electronic measurement of gravity can be obtained by measuring the voltage necessary to levitate the proof mass to a null point. See J. M. Goodkind, "The superconducting gravimeter," *Rev. Sci. Inst.* 70(11), 4131 (1999) and B. Richter and R. J. Warburton, "A New Generation of Superconducting Gravimeters," *Proc. 13$^{th}$ Int. Sym. Earth Tides*, Brussels (1998). Superconducting gravimeters have been shown to be able to measure gravity variations of less than 1 μGal over periods ranging from tens of minutes to over a year with very little drift and low noise. These gravimeters have sufficient resolution to observe and accurately measure earth tidal accelerations. However, they can only measure in the down direction and require a cryogenic cooler.

Seismometers rely upon the inertial force to deflect a mass from equilibrium. A mechanical seismometer is typically a single degree-of-freedom device with an inertial mass, or proof mass, supported by a spring-like system within a structural frame that is exposed to the acceleration. When the frame is accelerated, the movement of the proof mass lags behind that of the frame. Some type of displacement transducer can then be used to detect and measure the displacement of the proof mass relative to the frame. The acceleration can be easily calculated from the governing equation of motion for the mass-spring system. A relatively small mass and stiff spring flexure are used for seismometry so that the mass-spring system has a relatively high natural frequency (e.g., hundred of hertz) and large dynamic range (e.g., tens of g's). However, the spring stiffness suppresses low frequency signals and decreases sensitivity, so that such mechanical seismometers are generally not suitable for measuring earth tidal accelerations.

Inertial accelerometers are commercially available in a wide variety of ranges and types. Depending on the application, these commercial accelerometers are available with a wide variety of displacement transducers, sensitivity, and dynamic range. For example, the displacement transducer can be a capacitive sensor that measures the change in capacitance as a function of the distance between the movable proof mass relative to the frame. Alternatively, the displacement transducer can be a piezoresistive element, or strain gauge, that measures the strain in the mass-supporting springs. Such piezoresistive accelerometers have a wide dynamic range and can sense large shocks. Other accelerometers comprise piezoelectric, electromagnetic, or ferromagnetic displacement transducers. Furthermore, the inertial force on the proof mass can be balanced by applying a counterforce in a servo-feedback system to keep the proof mass in a stable position with respect to the frame. Such a null-balance accelerometer can provide good linearity and high measurement accuracy over a large dynamic range. Accelerometers based on an amorphous quartz proof-mass structure are widely used in commercial and military aircraft strap-down inertial navigation systems. These accelerometers exhibit better than 1 μG resolution over a +/−60 G dynamic range. See "Honeywell QA3000 Q-Flex® Accelerometer," [retrieved on 2004-5-[0]. Retrieved from the Internet:<URL:http://www.inertialsensor.com>.

Sensor packages based on microelectromechanical systems (MEMS) technology are especially attractive, since they may have improved performance and reduced size and power requirements, compared to conventional sensors. See J. Bernstein, "An Overview of MEMS Inertial Sensors," *Sensors*, pp. 14-21, February 2003. Capacitive-based microaccelerometers are commonplace for applications, such as automotive crash sensors and seismometry. In particular, they can have very small cross-sensitivity (i.e., response of the accelerometer to accelerations perpendicular to the principal sensing direction). They can be manufactured to be of small size, light in weight, rugged, and robust to operate in harsh environments. Furthermore, separate microaccelerometers with more than one orientation can be fabricated and integrated with electronics on a single chip, enabling easy multiaxis measurement. However, current micromachined accelerometers for crash sensors are designed to trigger the inflation of an airbag within milliseconds. Therefore, they tend to operate at high bandwidth (e.g., kilohertz) and high g, which requires spring flexures that are too stiff to detect tidal signals.

Digital accelerometers based on bulk silicon micromachining and wafer bonding have recently become available for seismic sensing. Four wafers are bonded together to provide a large proof mass suspended from silicon springs in a vacuum-sealed chamber. See J. Gannon et al., "A Robust Low Noise MEMS Servo Accelerometer," *ISA* (2001). A commercially available closed-loop MEMS accelerometer has a stated resolution of 300 nG/root (Hz) noise level over a 1000 Hz bandwidth. See "Applied MEMS Si-Flex Accelerometer," [retrieved on 2004-5-[0]. Retrieved from the Internet:<URL:http://www.appliedmems.com>. These accelerometers provide superior low-frequency response, high sensitivity, and low noise. While these commercial MEMS accelerometers are designed for operation at high g, the proof mass and stiffness of the spring flexure can be optimized to measure tidal accelerations.

Geophysics-Based Method for Locating a Stationary Earth Object

Figure 6:
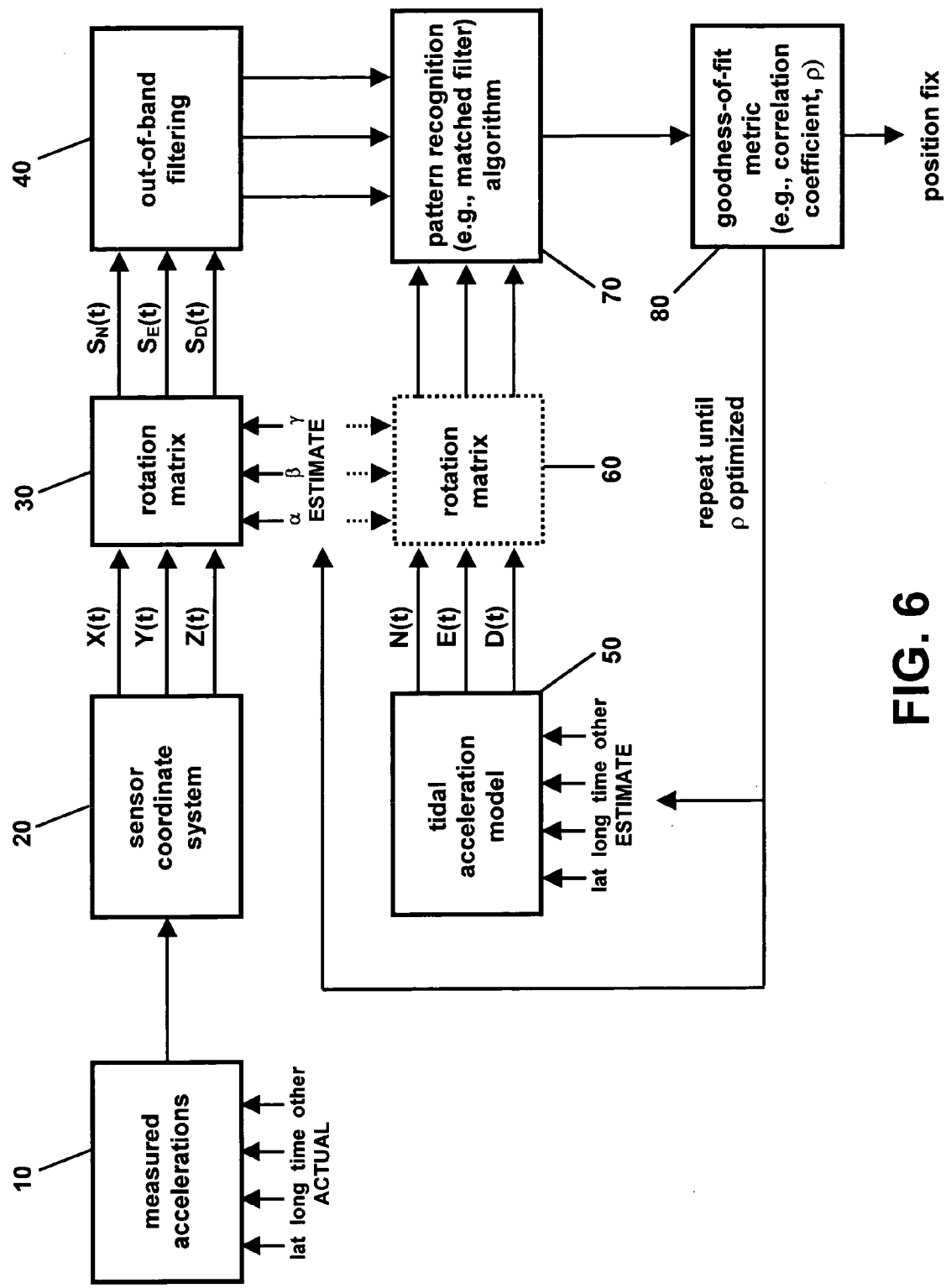
FIG. 6 shows the geophysics-based method of the present invention for locating a stationary earth object.

In FIG. 6 is shown the geophysics-based method for locating a stationary earth object according to the present invention. Sensor acceleration measurements can be combined with a tidal acceleration model to fix the position (i.e., latitude and longitude) of a stationary earth object. The method comprises providing a tidal acceleration model that predicts tidal accelerations as a function of time and location relative to a reference time in an earth-fixed frame comprising orthogonal axes, measuring an acceleration in at least one direction of the stationary earth object at an actual location for a period of time relative to the reference time with a sensor package in a sensor frame comprising orthogonal axes, transforming the sensor frame to a transformed frame using an estimated rotation matrix, estimating a position of the object to input to the model to provide a predicted acceleration at the estimated position, and comparing the transformed acceleration measurement to the predicted acceleration with a pattern recognition algorithm to provide a goodness-of-fit metric for the estimated position. The estimated position and rotation matrix can then be iterated until the goodness-of-fit metric is optimized. The inputs to the method are the time-varying accelerometer measurements, time of the measurements relative to the reference time and location, the tidal acceleration model, an initial estimate of the object's position, and estimates of the rotation angles necessary to align the orthogonal coordinate axes of the sensor frame with those of the earth-fixed frame of the model. The output of the method a position fix for the object in multiple dimensions (e.g., latitude and longitude, and three rotational angles).

At step 10, a gravitational acceleration in at least one direction is measured for a period of time by a sensor package at the location of the stationary earth object. The time-of-day relative to a known, but arbitrary reference clock is also provided from an internal clock in the sensor package. Other measurements of the environment, such as the ambient pressure and temperature, can also be taken by the sensor package and used to correct the accelerometer measurements or as inputs to the model.

Although an acceleration measurement in only one directional is required, the sensor package preferably comprises at least three individual accelerometers that have sensitive axes nominally aligned in mutually perpendicular directions. Additional accelerometers can be used for redundancy and to improve sensitivity. The sensed accelerometer signals can be processed and combined with other measurements to provide a time-varying acceleration vector in the sensor frame of reference comprising an orthogonal coordinate system having axes X(t), Y(t), and Z(t) at step 20.

The sensor coordinate system is arbitrary with respect to and normally distinct from the NED frame of the tidal acceleration model. The measured and modeled accelerations are comparable only if one frame can be transformed to the other frame. Since the sensor package is normally stationary and rigidly mounted relative to the earth (i.e., the attitude of a moving vehicle is not required), only a rotational transformation between the two coordinate systems is required. Therefore, at step 30, a rotation matrix, comprising three estimated plane rotations involving angles $\alpha$, $\beta$, and $\gamma$, can be applied to the sensor coordinate axes X(t), Y(t), and Z(t) to transform the accelerometer measurements in the sensor frame to a transformed frame, comprising orthogonal coordinates $S_N(t)$, $S_E(t)$, and $S_D(t)$. Alternatively, if the sensor frame is not transformed at step 30, the earth-fixed frame can be transformed to the sensor frame at step 60. Frequently, good initial estimates can be made for at least one of the rotation angles. For example, the sensor's local axes can be made to remain level and pointing in the same direction by mounting the cluster in a gimbaled platform. Due to the irregular shape of the geoid, the gimbaled frame may not align precisely with the geodetic frame, a difference known as the deflection of the vertical. However, the gravimetric "down" is different from the geodetic "down" by a relatively small angle or deflection from the vertical.

At step 40, the transformed accelerometer measurements can be filtered to remove any "out-of-band" noise. The highest frequency of the tidal acceleration signal is about 23 µHz, due to the semi-diurnal motion. However, there are many other higher frequency motions in the sensed environment that can interfere with the relatively weak accelerations due to slow-moving earth tides. These noise sources may include office noise, people or vehicles moving nearby, other sounds, etc. These out-of-band accelerations can be easily filtered from the lower frequency accelerometer signals to provide low-pass transformed accelerometer measurements.

At step 50, an initial estimate of the object's position (i.e., geodetic latitude and longitude), along with the known time-of-day relative to the reference location, are entered into the tidal acceleration model. Frequently, good initial estimates can be made of the object's position. For example, the direction of the earth spin axis may be available from gyrocompassing, providing an initial estimate of latitude. Alternatively, the object's position may be inferred an IMU calculation relative to a previous known location. Other environmental inputs, such as local pressure and temperature, can also be provided to the model. Also, in-band noise, such as ocean tides and atmospheric pressure changes, can be eliminated by including them in the tidal acceleration model. The tidal acceleration model uses an earth frame having coordinate axes that are fixed to the earth. A convenient earth-fixed frame comprises the geodetic WGS84 North-East-Down (NED) coordinate system. Given the estimated latitude and longitude and known time (along with any other local information), the model can predict the temporal evolution of the local orthogonal gravity vectors N(t), E(t), and D(t) in the NED frame at the object's estimated position.

If the sensor frame was not transformed to the earth frame at step 30, a rotation matrix, comprising three estimated plane rotations involving angles $\alpha$, $\beta$, and $\gamma$, can alternatively be applied to the earth frame coordinate axes to transform the earth-fixed frame to the sensor frame at step 60.

At step 70, the measured accelerations in the transformed frame $S_N(t)$, $S_E(t)$, and $S_D(t)$, are compared to the predicted acceleration vectors in the earth-fixed frame N(t), E(t), and D(t) at the object's estimated position using a pattern recognition algorithm to provide a "goodness-of-fit" metric at step 80. Preferably, the pattern recognition algorithm comprises a "matched filter" algorithm wherein the goodness-of-fit metric can be a correlation coefficient, p. The correlation coefficient indicates the correlation between the measured accelerations and the accelerations predicted by the tidal acceleration model. The matched filter algorithm has been shown to produce optimal signal-to-noise ratios when detecting signals in the presence of additive white Gaussian noise. Other filtering techniques, such as Kalman filtering, can be used to provide improved signal-to-noise ratios in the presence of other types of noise. See, e.g., Steven W. Smith, *The Scientist and Engineer's Guide to Digital Signal Processing*, California Publishing Co., San Diego, Calif., (1997).

Figure 7:
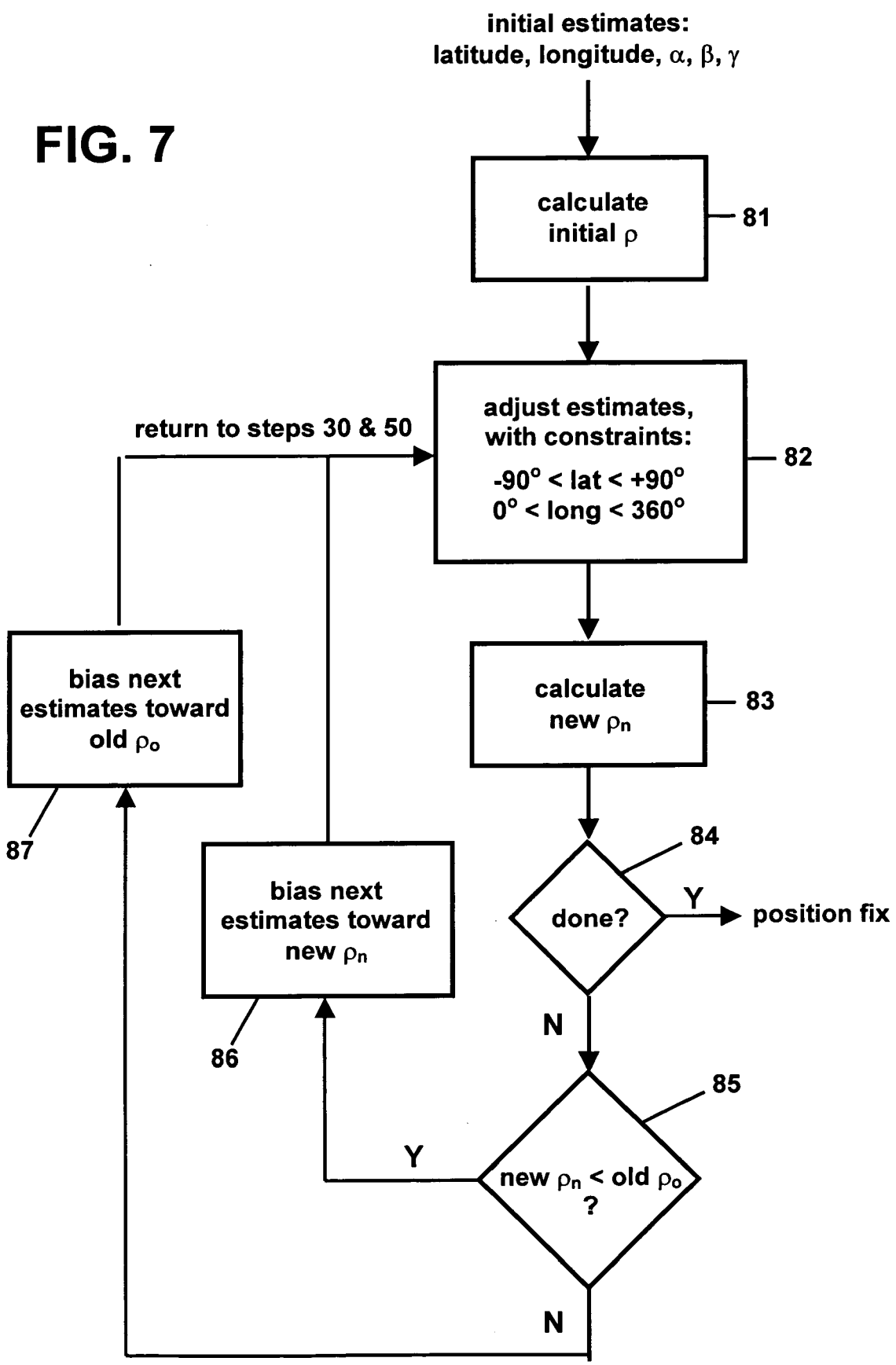
FIG. 7 shows a search algorithm for determining the position of the stationary earth object.

In FIG. 7 is shown a search algorithm for optimizing the correlation coefficient ρ to provide the best estimate of the position of the stationary earth object. At step 81, an initial correlation coefficient $\rho_o$ is provided by the matched filter algorithm, based on the initial estimates of the object's position and the rotation matrix. At step 82, new estimates of latitude, longitude, and the rotation angles $\alpha$, $\beta$, and $\gamma$ are input to the method at steps 30 and 50, subject to constraints. These constraints can be that the latitude must be between −90° and +90° and that the longitude must be between 0° and 360°. More restrictive constraints can be used, for example, if an approximate position is known. These new estimates will provide a new correlation coefficient $\rho_n$ at step 83. The correlation coefficient $\rho_n$ is at a maximum value when the signals are perfectly correlated. If the new transformed acceleration measurements and new acceleration predictions are highly correlated (i.e., $\rho_n$ is at a limit of the system's ability to resolve further changes), no addition iteration is necessary and a position fix for the object is output at step 84. If the new transformed measurements and the new predictions are not sufficiently correlated, updated estimates can be made. In general, if the new correlation coefficient $\rho_n$ is less than the old $\rho_o$ (e.g., the initial $\rho_o$ prior to the first iteration), then the updated next estimate can be biased toward the previous estimate of the old $\rho_o$ at step 87. Alternatively, if the new correlation coefficient $\rho_n$ is greater than the old $\rho_o$, then the updated next estimate can be biased toward the new $\rho_o$ at step 86. The updated next estimates are input to the method at steps 30 and 50. Steps 82 through 87 can be repeated until the correlation coefficient $\rho$ is optimized (i.e., when the changes in the value of $\rho$ at each cycle are below the limit of the method's ability to further resolve changes in the correlation coefficient). The latitude and longitude estimates at the optimized $\rho$ provide the position fix of the stationary earth object. Other search algorithms can also be used, depending on the accuracy and speed desired.

The accuracy and precision of the position fix depend on a number of factors, including the fidelity of the tidal acceleration model and the effect of in-band, non-tidal variations in the acceleration, such as atmospheric variability, sensor noise amplitude and spectral shape, and mechanical mounting precision. In general, disturbances at frequencies near the tidal band will strongly affect the measurement accuracy, leading to bias errors. Out-of-band disturbances will tend to decrease the measurement precision.

Figure 8:
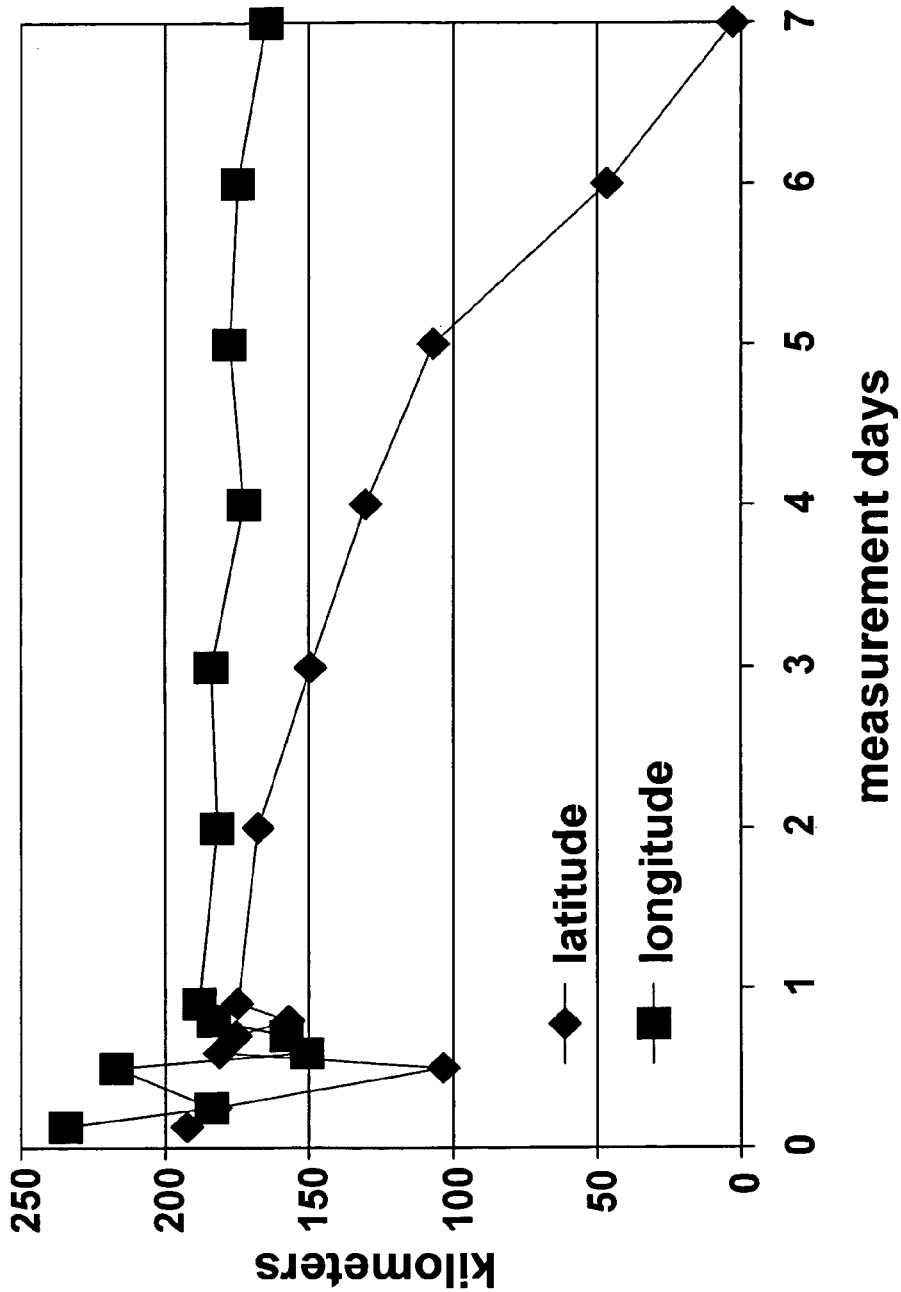
FIG. 8 shows the position fix uncertainty as a function of measurement time using actual one-dimensional gravimeter data, calculated using the geophysics-based method of the present invention.

In FIG. 8 is shown the computation of a position fix using actual gravimeter data and the geophysics-based method of the present invention considering only one axis of the acceleration vector. The measurements were obtained at the Walferdange Observatory at Luxemburg, Netherlands (49.665° N latitude; 6.153° E longitude) using a superconducting GWR Instruments Compact Tidal Gravimeter. See "GWR INSTRUMENTS, INC: Superconducting Gravimeters," [retrieved on 2004-3-26]. Retrieved from the Internet: <URL:http://www.gwrinstruments.com/GWR_tidal-bro.html>. This instrument has a sensitivity of one nGal, or about one part in $10^{12}$ of surface gravity, and a stability of a few μGal per year. Gravity data was taken at 10 second intervals for seven days, starting on 5 Jan. 2004. The instrument only provided a single-axis measurement in the gravimetric "down" direction and was not pressure compensated. Therefore, gravity measurement precision was primarily limited by noise from atmospheric fluctuations. Using the simple tidal acceleration model described above in the D axis (i.e., ignoring the deflection from the vertical), the position was located to within 250 km in about 90 minutes and to about 2.8 km in latitude in 7 days. As only a single axis of data was available, these results do not indicate the resolution ultimately achievable. However, this result demonstrates that the tidal acceleration model correctly predicts the gravity-induced tidal accelerations and that the method can accommodate noisy (real) signals.

Figure 9:
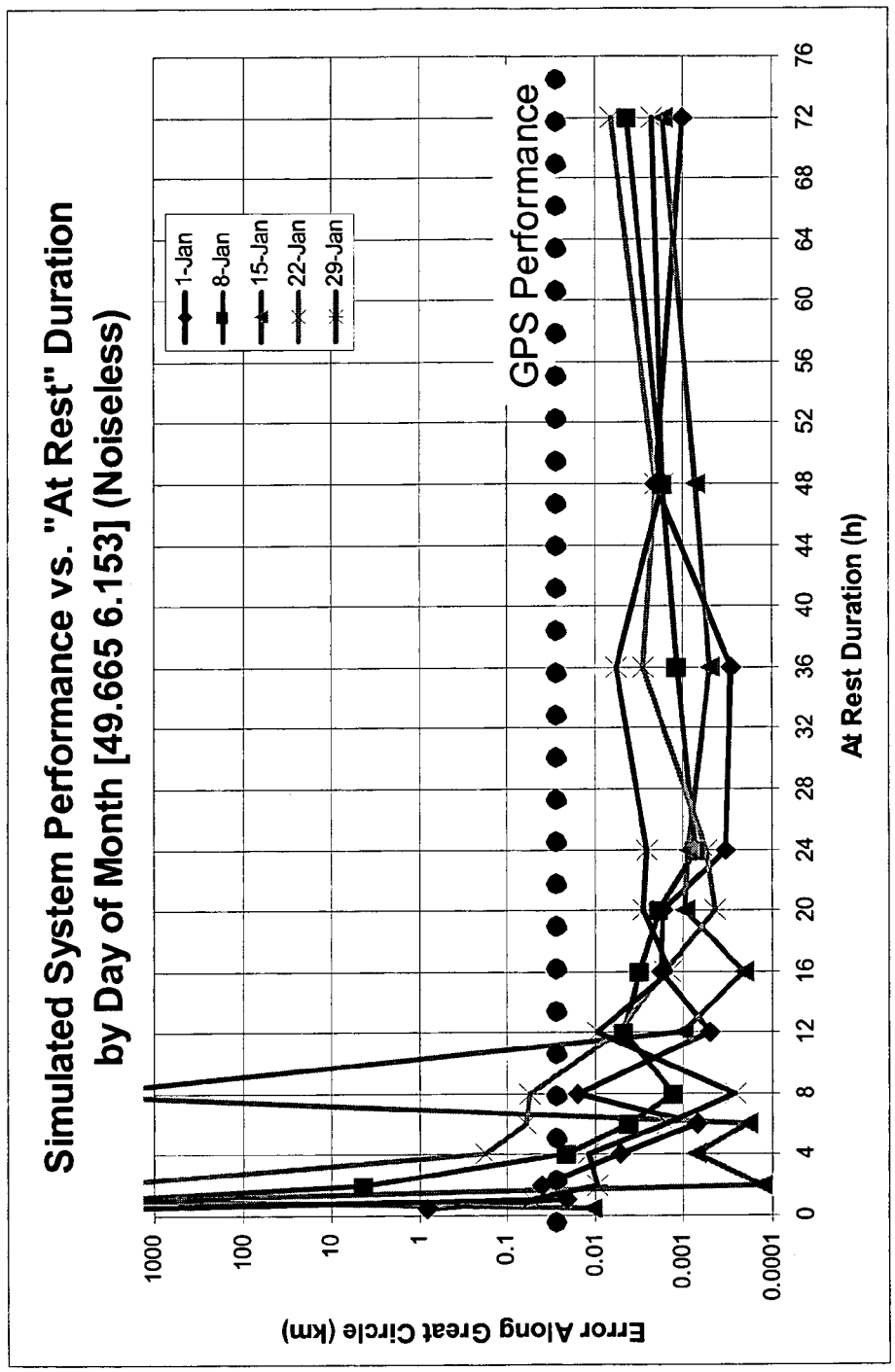
FIG. 9 shows the position fix uncertainty as a function of "at rest" duration using simulated data and noiseless sensors for various days of the month, using the geophysics-based method of the present invention.

FIG. 9 shows the results of another computation using simulated data in three axes for the Walferdange location, using the same geophysics-based method as described above. Errors were plotted as a function of the "at rest" duration, corresponding to the period of time over which the object is stationary. Data beginning on different days of the month were plotted on the same scale, as per the legend. For "at rest" durations greater than 12 hours (i.e., a tidal period), the method converged to a position fix accuracy to within 10 meters, which is below the GPS level of accuracy. For shorter periods, the accuracy varies with the day of the month. For example, the method fixed the object's position to within 100 km in less than 2 hours for the dates of January 1 and 29. This is because of the dependence of the magnitude of the tidal acceleration on the alignment of tidal components of the sun and the moon, which is at a maximum at conjunction and opposition (i.e., new and full moon).

The present invention has been described as a geophysics-based method of locating a stationary earth object. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A geophysics-based method for fixing a position of a stationary earth object, comprising:
  a) providing a model that predicts tidal acceleration at a plurality of locations on the earth as a function of time and location relative to a reference time in an earth-fixed frame comprising orthogonal axes,
  b) measuring an acceleration in at least one direction of the stationary earth object at an actual location for a period of time relative to the reference time with a sensor package in a sensor frame comprising orthogonal axes,
  c) transforming the sensor frame using an estimated rotation matrix,
  d) estimating a position of the object to input to the model to provide a predicted acceleration at the estimated position,
  e) comparing the measured acceleration in the transformed frame to the predicted acceleration in the earth-fixed frame with a pattern recognition algorithm to provide a goodness-of-fit metric for the estimated position, and
  f) repeating steps b) to e) at least once to provide the position fix for the actual location of the stationary earth object.

2. The method of claim 1, wherein the earth-fixed frame comprises a North-East-Down coordinate system.

3. The method of claim 1, wherein the position estimating of step d) comprises estimating a latitude and a longitude of the object.

4. The method of claim 1, wherein the period of time is greater than 2 hours.

5. The method of claim 1, wherein the period of time is greater than 12 hours.

6. The method of claim 1, wherein the sensor package comprises at least one accelerometer.

7. The method of claim 6, wherein the at least one accelerometer has a sensitivity of better than 1 μG for frequencies of less than 23 μHz.

8. The method of claim 6, wherein the at least one accelerometer has a sensitivity of better than 0.1 μG for frequencies of less than 23 μHz.

9. The method of claim 6, wherein the at least one accelerometer has a sensitivity of better than 10 nG for frequencies of less than 23 μHz.

10. The method of claim 6, wherein the at least one accelerometer has a dynamic range of greater than positive to negative 1 G relative to the local gravity vector.

11. The method of claim 1, further comprising measuring at least one environmental condition at the actual location to input to the model.

12. The method of claim 1, wherein the pattern recognition algorithm comprises a matched filter algorithm.

13. The method of claim 12, wherein the goodness-of-fit metric comprises with a correlation coefficient.

14. The method of claim 1, wherein step f) is repeated until the method is unable to resolve further changes in the goodness-of-fit metric.

15. The method of claim 1, wherein the one of the orthogonal axes of the sensor frame comprises a gravimetric "down" axis.

16. The method of claim 3, wherein an initial latitude estimation is determined by gyrocompassing.

17. The method of claim 1, wherein an initial position estimation is determined by an inertial measurement unit calculation relative to a previous known location.

18. The method of claim 1, wherein the at least one direction comprises two perpendicular directions.

19. The method of claim 1, wherein the at least one direction comprises three perpendicular directions.

20. The method of claim 1, wherein the sensor package comprises a gimbaled platform.

21. The method of claim 1, wherein the sensor package comprises a strap-down platform.

22. The method of claim 6, wherein the at least one accelerometer comprises a gravimeter.

23. The method of claim 6, wherein the at least one accelerometer comprises an inertial accelerometer.

24. The method of claim 6, wherein the at least one accelerometer is based on microelectromechanical systems technology.

* * * * *